May 13, 1958 J. J. BARRY 2,834,282

MACHINE FOR TREATING VEGETABLES AND FRUITS

Filed Sept. 7, 1956

Inventor
JAMES J. BARRY
By Alex. E. MacRae
Attorney

United States Patent Office 2,834,282

Patented May 13, 1958

1

2,834,282

MACHINE FOR TREATING VEGETABLES AND FRUITS

James J. Barry, Black's Harbour, New Brunswick, Canada, assignor to Connors Bros. Limited, Black's Harbour, New Brunswick, Canada Application September 7, 1956, Serial No. 608,610

1 Claim. (Cl. 100—98)

This invention relates to a device for treating vegetables and fruits.

An object of the invention is to provide a simply constructed machine adapted to quickly and efficiently remove skins and the like from cooked vegetables and fruits and to produce a mashed or riced product which is highly satisfactory in use.

To this end the invention broadly comprises the provision of a rotatably mounted perforated drum, means for feeding material to be treated to a portion of the external surface of the drum, and means for applying pressure to such material to force the pulp thereof through the perforations in the drum, the skins and the like being retained upon the external surface of the drum, such pressure applying means comprising a pair of reciprocally mounted plungers, and means for reciprocating the plungers in opposite directions.

The invention will be described with reference to the accompanying drawing, in which.

Figure 1:
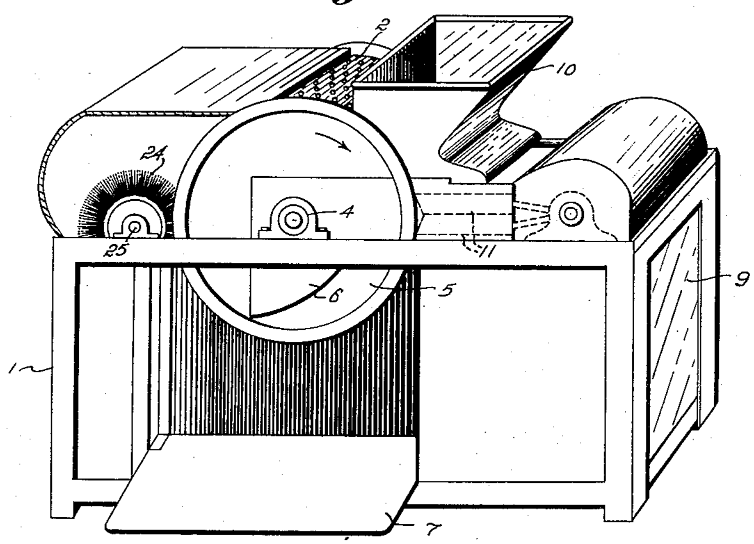
Figure 1 is a perspective view of a machine in accordance with the invention.
Figure 2:
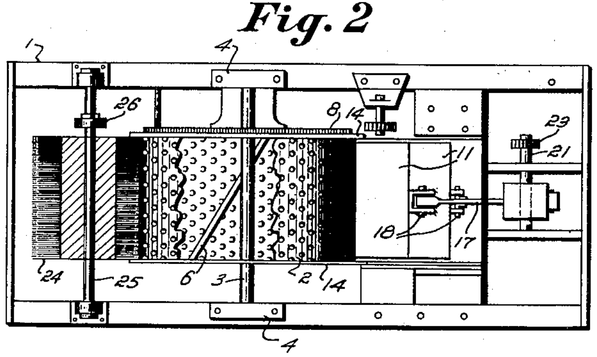
Figure 2 is a plan view, certain parts being removed or broken away for clarity of illustration.
Figure 3:
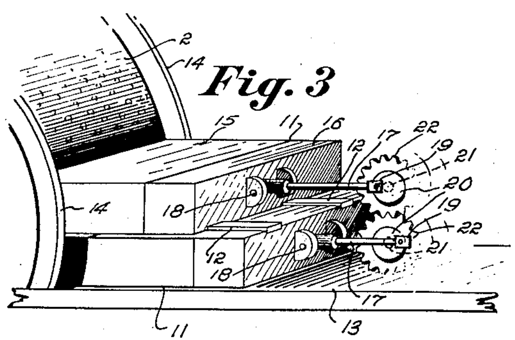
Figure 3 is a perspective view of the reciprocating plungers.

In the drawings, 1 is a main frame and 2 a perforated drum carried by a shaft 3 journalled in bearings 4 supported on the frame. One end of the drum is open as indicated at 5. An inclined scraper blade 6, in fixed relation to the frame, extends through the drum and has its edge in engagement with or close proximity to the interior surface of the drum to direct material through opening 5 onto a chute 7. The drum is arranged to be driven in the direction of the arrow by suitable means, such as a gear 8 connected to a power source, which may comprise a motor housed within a housing carried by the frame.

A hopper 10 carried by the frame is arranged to receive material to be treated and to direct the same onto or adjacent a lateral surface of the drum. Positioned directly below the outlet of hopper 10 are a pair of plungers 11. Each plunger is of generally rectangular form. One plunger is superimposed upon the other for sliding movement with respect thereto. Slide bearings 12 may be provided between the plungers. The lower plunger is slidingly supported on a frame member 13. It will be observed that one end surface of each plunger is arranged to closely approach the perforated surface of the drum on reciprocation of the plunger. As shown, each such end surface extends substantially from one end to the other of the drum. The drum is provided with peripheral end flanges 14 which are in closely fitting relation to the sides of each plunger adjacent such end surface when the latter is in close proximity to the drum. Each plunger 11 may be formed of any suitable material, such as metal, wood, plastic composition, and the like. A preferred form comprises a main plastic composition section 15 adjacent the drum and a metal section 16 fixed to section 15.

Means for reciprocating the plungers 11 in opposite directions comprises a connecting rod 17 pivotally connected to each plunger at 18. Each connecting rod 17 is also eccentrically connected at 19 to a disc 20. Each disc

2

20 is mounted on a shaft 21. Shafts 21 are drivably connected by gears 22, one of the shafts 21 being driven by a gear 23 from the power source. It will be observed that the eccentric connections are such that, when one plunger is at one end of its stroke closely adjacent the surface of drum 2, the other plunger will be at the other end of its stroke in a position farthest away from the surface of drum 2.

Means for cleaning the external surface of drum 2 may comprise a rotary brush 24 mounted on shaft 25 driven by gear 26 from the power source. As shown brush 24 is arranged to engage an area of the lateral surface of drum 2 opposite to the area of feed.

In operation an unpeeled cooked vegetable or fruit, such as potatoes, is fed into the hopper 10. On reciprocation of the upper plunger 11 away from drum 2, the material in the hopper falls between the drum and the end of such plunger. On subsequent reciprocation of the upper plunger towards the drum, the material is compressed therebetween, the pulp being forced through the perforations in the drum in a mashed or riced condition, the peelings or skins however, remaining on the outside surface of the drum. Material falling between the lower plunger and the drum treated in the same manner, both plungers cooperating to subject the entire feed of material to a peel or skin removing action and an extrusion of the pulp through the perforated drum. The scraper 6 discharges the pulp onto the chute 7. Peelings adhering to the external drum surface are removed by the rotary brush 24.

The machine described provides an efficient satisfactory and rapid means of removal of peelings or skins from cooked fruits and vegetables, while producing a most acceptable mashed or riced product.

Moreover, the machine described provides a more effective means of removing potato skins than has heretofore been possible. In the conventional type of abrasive peeler it is difficult, if not impossible, to remove the skins from the eyes of the potatoes, especially if the eyes are deep, without considerable waste. The present machine effectively removes the skins from the potatoes, including the eyes, without substantial waste. Thus the peelings discharged from the machine are substantially paper thin.

I claim:

A machine for treating cooked fruits or vegetables which comprises a frame, a perforated drum rotatably mounted in the frame, a pair of plungers reciprocally mounted in the frame, one of said plungers being superimposed on the other plunger, each plunger having an end surface facing the external surface of the drum and movable with the plunger into substantial engagement with said external drum surface, the width of each said plunger end surface and said external drum surface being substantially coextensive, means for feeding material to be treated between said plunger end surfaces and said external drum surface to press a portion of said material through said perforated drum, and means for reciprocating the plungers in opposite directions.

References Cited in the file of this patent

UNITED STATES PATENTS

| | | |
|---|---|---|
| 241,557 | Meyer | May 17, 1881 |
| 695,585 | Stanley | Mar. 18, 1902 |
| 767,517 | Glenn | Aug. 16, 1904 |
| 2,209,760 | Berry | July 30, 1940 |

FOREIGN PATENTS

| | | |
|---|---|---|
| 62,506 | Sweden | May 25, 1923 |
| 76,767 | Switzerland | Feb. 1, 1918 |
| 77,324 | Sweden | Mar. 20, 1931 |
| 236,184 | Switzerland | May 16, 1945 |
| 457,955 | Germany | Mar. 27, 1928 |